C. C. HAMMOND.
METER FOR MEASURING LIQUIDS.
APPLICATION FILED FEB. 10, 1908.

903,566.

Patented Nov. 10, 1908.

3 SHEETS—SHEET 1.

Witnesses
A. J. McCauley
Nills L. Church

Inventor:
Chester C. Hammond
by Bakewell Cornwall
Atty's.

C. C. HAMMOND.
METER FOR MEASURING LIQUIDS.
APPLICATION FILED FEB. 10, 1908.
903,566.
Patented Nov. 10, 1908.
3 SHEETS—SHEET 2.
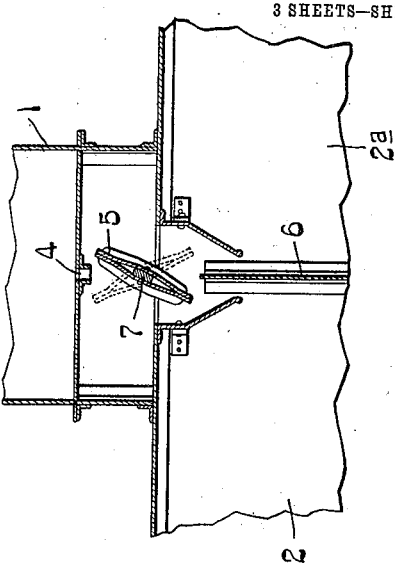
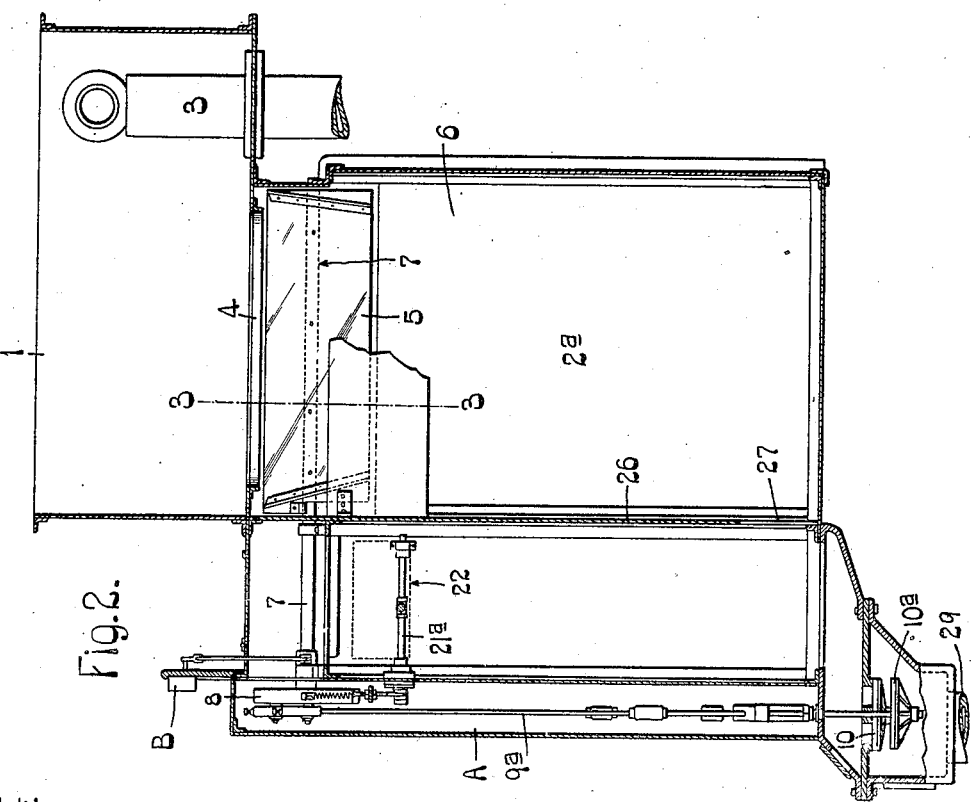
Witnesses
A. J. McCauley
Wells L. Church
Inventor:
Chester C. Hammond
by Bakewell & Cornwall
Att'ys.

C. C. HAMMOND.
METER FOR MEASURING LIQUIDS.
APPLICATION FILED FEB. 10, 1908.

903,566.

Patented Nov. 10, 1908.

3 SHEETS—SHEET 3.

Witnesses
A. J. McCauley
Wells L. Church

Inventor:
Chester C. Hammond
by Bakewell Cornwall Atty's

UNITED STATES PATENT OFFICE.

CHESTER C. HAMMOND, OF ST. LOUIS, MISSOURI, ASSIGNOR OF ONE-HALF TO JOHN J. LICHTER AND WILLIAM JENS, OF ST. LOUIS, MISSOURI.

METER FOR MEASURING LIQUIDS.

No. 903,566.	Specification of Latters Patent.	Patented Nov. 10, 1908.

Application filed February 10, 1908. Serial No. 415,142.

*To all whom it may concern:*

Be it known that I, CHESTER C. HAMMOND, a citizen of the United States, residing at St. Louis, Missouri, have invented a certain new and useful Improvement in Meters for Measuring Liquids, of which the following is a full, clear, and exact description, such as will enable others skilled in the art to which it appertains to make and use the same, reference being had to the accompanying drawings, forming part of this specification, in which—

Figure 1:
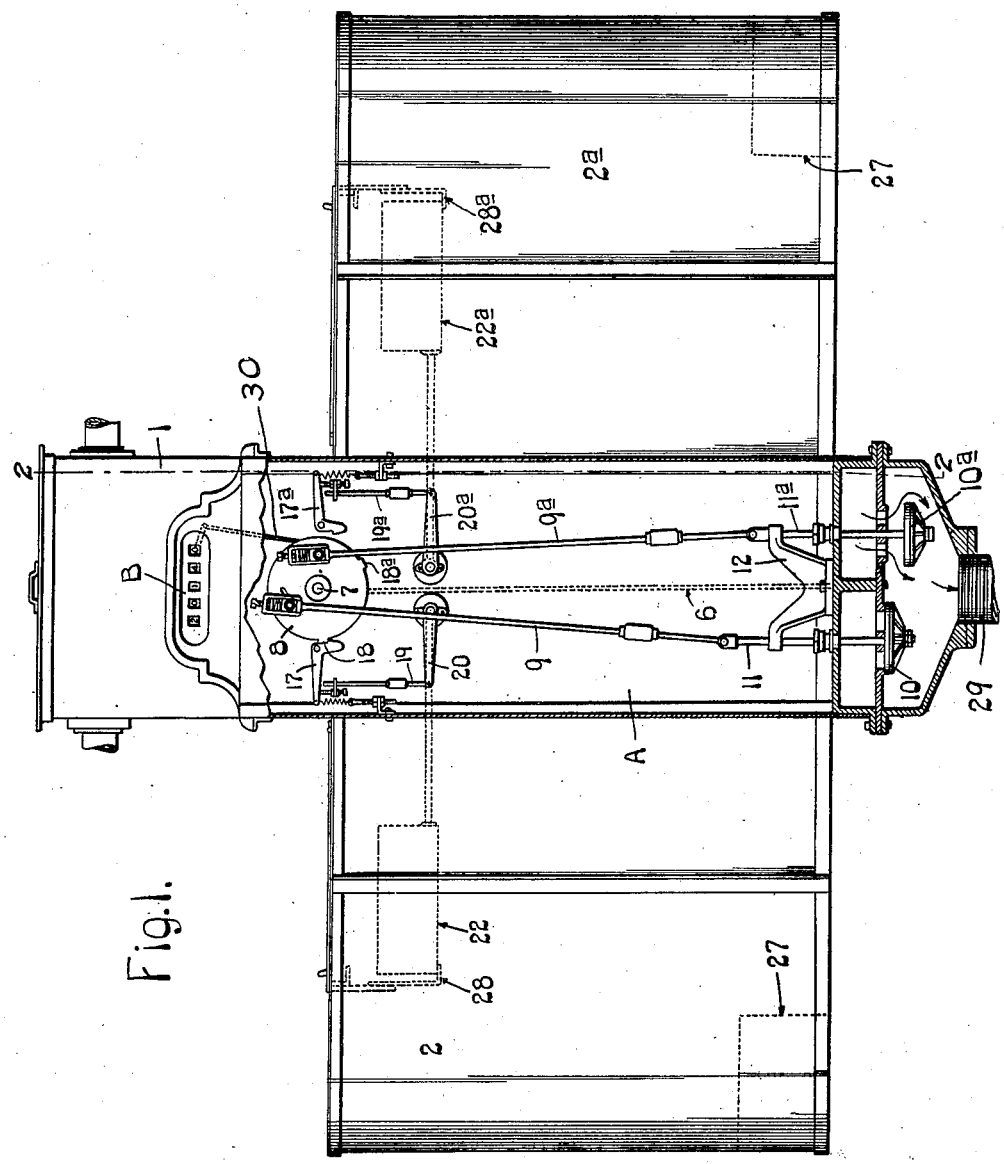
Figure 4:
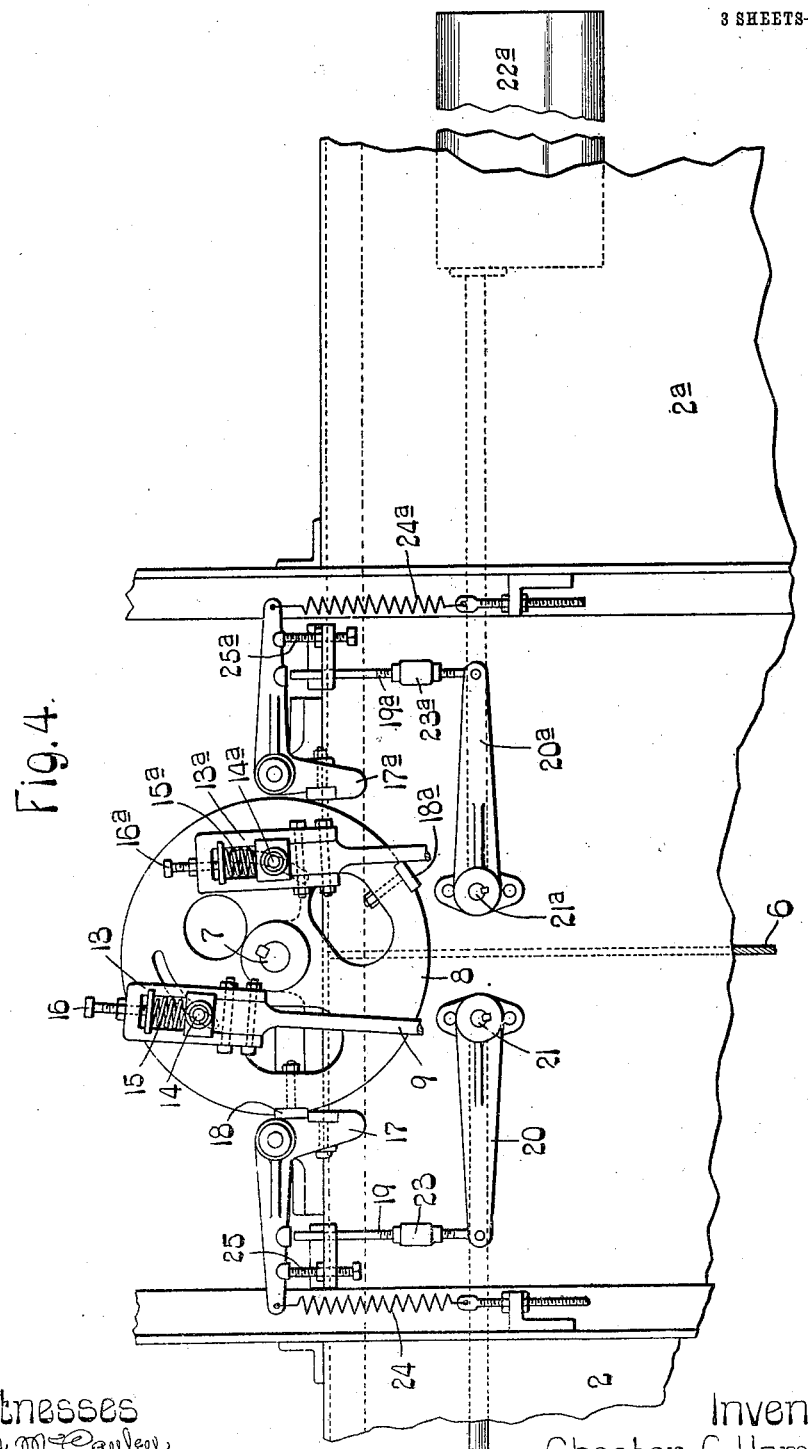

Figure 1 is a front elevation of a meter constructed in accordance with my invention, portions of this figure being broken away to more clearly illustrate the construction of the actuating mechanism for the deflector; Fig. 2 is a vertical cross sectional view of Fig. 1 taken on approximately the line 2—2 of said figure; Fig. 3 is a cross sectional view taken on the line 3—3 of Fig. 2; and Fig. 4 is an enlarged detail view of a slightly modified form of my invention.

This invention relates to meters for measuring liquids.

The main object of my invention is to provide a meter of simple construction that will accurately measure large quantities of liquid of any temperature. Other desirable features of my invention will be hereinafter pointed out.

Briefly described, the preferred form of my invention as herein shown consists of a plurality of measuring tanks or receptacles, a member for introducing or deflecting the liquid to be measured into said receptacles, automatically operated means for actuating said member to introduce or deflect predetermined quantities of liquid into the different tanks intermittently, means for discharging the liquid from said measuring tanks, and means for recording the number of movements imparted to said deflecting member so as to determine the quantity of liquid that has been introduced into said measuring tanks.

Referring to the drawings which illustrate the preferred form of my invention, 1 designates a receiving tank, and 2 and 2ᵃ designate two measuring tanks or receptacles that are preferably located underneath the receiving tank. The liquid to be measured is introduced into the receiving tank 1 by means of a supply pipe 3 and is discharged from said tank through a discharge opening, preferably an elongated slot 4, in the bottom of said tank. Means is provided for causing the liquid in the receiving tank to flow into either of the measuring tanks 2 and 2ᵃ, and in the construction herein shown said means consists of an oscillating deflector 5 arranged below the discharge opening in the receiving tank. The division wall 6 between the two measuring tanks 2 and 2ᵃ is located in alinement with the discharge opening 4 in the receiving tank and also in alinement with the longitudinal axis of the deflector 5 so that when said deflector is in the position shown in full lines in Fig. 3 the liquid in the receiving tank will flow into the measuring tank 2. When said deflector is shifted so that it occupies the position shown in broken lines in Fig. 3, the contents of the receiving tank 1 will flow or be deflected into the measuring tank 2ᵃ. The deflector 5 is operated automatically when the liquid in the measuring tanks reaches a certain level, and means is provided for recording the number of movements of the deflector so that the quantity of liquid which passes through the meter can be determined accurately.

In the construction herein shown, the deflector 5 is connected to a horizontally disposed shaft 7 that is provided at its front end with a wrist plate 8 and this wrist plate is connected by means of links 9 and 9ᵃ to the stems of valves 10 and 10ᵃ which close discharge openings in the bottoms of the measuring tanks. The valves 10 and 10ᵃ are arranged outside of the measuring tanks and are held in engagement with their coöperating seats on the underneath sides of the bottoms of said tanks by means of the links 9 and 9ᵃ, said links being connected to the wrist plate 8 in such a manner that the valve 10 will be closed and the valve 10ᵃ opened when the deflector 5 is in the position shown in full lines in Fig. 3 for deflecting the liquid into the tank 2.

The wrist plate 8 and links 9 and 9ᵃ are arranged in a housing or compartment A located outside of the measuring tanks, and the stems 11 and 11ᵃ of the valves 10 and 10ᵃ, respectively, project into said compartment through stuffing boxes in the walls of the measuring tanks, as shown clearly in Figs. 1 and 2, said valve stems being guided by a member 12 located in the compartment A. The links 9 and 9ᵃ are yieldingly connected to the wrist plate 8 so as to take up slack between said links and wrist plate and also to insure seating of the valves 10 and 10ª, said links being provided at their upper ends with yokes 13 and 13ª, respectively, which embrace blocks carried by pins 14 and 14ª secured to the wrist plate 8. Coiled expansion springs 15 and 15ª are interposed between the blocks on said pins and the upper sides of the yokes on the links so as to always force the links upwardly and thus hold the discharge valves for the measuring tanks on their seats, said yokes being provided with screws 16 and 16ª which can be adjusted to vary the tension of the springs 15 and 15ª. I also prefer to adjustably connect the pins 14 and 14ª to the wrist plate so that the actuating means for the valves 10 and 10ª can be adjusted to insure a perfect seating of said valves.

In the construction herein shown the pins 14 and 14ª are mounted in elongated slots in the wrist plate 8 disposed eccentrically to the center of said plate, said pins being clamped in position by means of nuts on the inner ends thereof.

The deflector 5 and valves 10 and 10ª are locked in position by means of pivotally mounted dogs or locking devices 17 and 17ª that coöperate with lugs or teeth 18 and 18ª on the periphery of the wrist plate 8, and means are provided for automatically tripping said locking devices or moving them out of engagement with said coöperating teeth so as to release the wrist plate and thus permit the deflector 5 to be moved and the valves to open. Said means consists of plungers 19 and 19ª connected to the outer ends of arms 20 and 20ª which are secured to horizontally disposed rock shafts 21 and 21ª that project through stuffing boxes in the walls of the measuring tanks, movement being imparted to said rock shafts by means of floats 22 and 22ª located inside of the measuring tanks and fastened to the outer ends of arms on said rock shafts.

The plungers 19 and 19ª that trip the dogs which lock the wrist plate in position, are so constructed that they can be shortened or lengthened, thereby enabling the tripping mechanism to be so adjusted that it will operate when the liquid in the measuring tanks reaches different levels, the plungers herein shown each consisting of two parts that are adjustably connected together by means of turn buckles or similar devices 23 and 23ª. The locking dogs or catches are forced toward the periphery of the wrist plate by means of springs 24 and 24ª which can be adjusted by means of screws, as shown in Fig. 4, and adjustable stops 25 and 25ª are provided for determining the normal positions of said dogs so that the inner ends thereof will not bear upon the periphery of the wrist plate 8. I prefer to arrange a partition 26 in each of the measuring tanks so as to sub-divide said tank into two compartments, one of which contains the float and the other of which receives the liquid as it enters the tank, the partition 26 in each tank being provided with an opening or cut-out portion 27, as shown in dotted lines in Fig. 1, so that the liquid can flow from the receiving compartment to the compartment in which the float is located. In this way I prevent the floats in the measuring tanks from being agitated or vibrated by the liquid as it flows into said tanks as the liquid in the float compartments always remains quiet.

As shown in Fig. 1, the measuring tanks are provided with supports 28 and 28ª which sustain the floats during the time they are not supported by the liquid in said tanks.

In the form of my invention shown in Figs. 1 and 2, the horizontally disposed rock shafts 21 and 21ª to which the floats are connected, are located below the highest level to which the liquid in said tank rises so that it is necessary to provide stuffing boxes in the walls of the tanks to receive said shafts. If desired, however, the shafts 21 and 21ª can be so located that they will never be submerged by the liquid in the measuring tanks and consequently it will not be necessary to provide the walls of the tanks with stuffing boxes for receiving said shafts, this construction being illustrated in Fig. 4.

Having described the construction of my improved meter I will now describe the operation of same. The liquid to be measured flows into the receiving tank 1 through the supply pipe 3 and is discharged from said tank in the form of a thin stream or sheath onto the deflector 5 which discharges or deflects the liquid into the measuring tank 2 when said deflector is arranged in the position shown in full lines in Fig. 3, the discharge valve for said measuring tank 2 being closed at such times. When the liquid in said measuring tank 2 reaches a certain level it will raise the float 22 and thus cause the plunger 19 to move the dog 17 out of engagement with the coöperating tooth 18 on the wrist plate 8. The weight of the liquid will then force the valve 10 downwardly and permit the contents of the measuring tank 2 to flow from said tank into the discharge pipe 29. As the valve 10 moves downwardly it pulls the link 9 downwardly and thus oscillates the deflector 5 and turns it into the position shown in broken lines in Fig. 3, thereby cutting off the flow of liquid to the measuring tank 2 and deflecting it into the measuring tank 2ª. The movement of the wrist plate carries the tooth 18ª on said plate into engagement with the locking dog 17ª which locks said wrist plate and the deflector 5 in the position shown in broken lines in Fig. 3 until the liquid in the measuring tank 2ª rises high enough to cause the float 22ª to trip the locking dog 17ª and free it from engagement with the wrist plate, the liquid in the measuring tank 2ª being discharged automatically as soon as the locking dog 17ª is tripped. These movements continue automatically during the time liquid is flowing into the receiving tank so that the measuring tanks are filled and emptied intermittently.

The meter comprises registering mechanism B of any preferred form, such, for example, as a revolution counter, and the movements of the deflector and wrist plate are transmitted to said counter through any suitable mechanism, such for example, as a link 30, so that the quantity of liquid which flows through the measuring tanks can be determined accurately by multiplying the contents of one of the measuring tanks by the number of times the deflector has been oscillated.

While this meter is adapted to measure any liquid and at any temperature, it is particularly useful in measuring the hot and oily water coming from condensers and enables an engineer to keep an accurate record of the duties of the engine with which the meter is used. It will, of course, be obvious that the meter can be calibrated to register in gallons, cubic feet or pounds but the particular construction of the registering mechanism is immaterial so far as my present invention is concerned.

Having thus described my invention, what I claim as new and desire to secure by Letters Patent is:

1. A liquid meter comprising a plurality of stationary measuring tanks having discharge valves, a member for deflecting or introducing liquid into said tanks, means for causing said member to change its position when either of said discharge valves opens locking devices for holding said member in its different positions, means operated by the liquid in said tanks for tripping said locking devices so as to release said member, and means for registering the number of movements that said member makes; substantially as described.

2. A liquid meter comprising stationary measuring tanks provided with discharge valves, means for holding said valves closed, a member for deflecting or introducing the liquid to be measured into said tanks, and means operated by the liquid in said tanks for releasing the discharge valves of the measuring tanks at different times, the means that holds said valves closed also operating to change the position of said deflecting member as said discharge valves are released; substantially as described.

3. A liquid meter comprising a receiving tank provided with a discharge opening, a plurality of measuring tanks, a member for deflecting liquid from the receiving tank into either of said measuring tanks, discharge valves for said measuring tanks, locking means for said valves which hold the valve of one tank closed while the valve of the other tank is open, floats in said tanks which actuate the locking means to release said valves when the liquid in said measuring tanks reaches a certain level, and connections between said valves and said deflecting member for shifting said member when the valve of either tank opens; substantially as described.

4. A liquid meter comprising a receiving tank provided with a discharge opening, a plurality of stationary measuring tanks, a deflector for causing the liquid in the receiving tank to flow into either of said measuring tanks, discharge valves for said measuring tanks, and connections comprising rods and springs arranged between said valves and said deflector for shifting the deflector when the discharge valves open; substantially as described.

5. A liquid meter comprising a receiving tank provided with a discharge opening, a plurality of stationary measuring tanks, a deflector for causing the liquid in the receiving tank to flow into either of said measuring tanks, means for locking said deflector, means for moving said locking means operated by the liquid in the receiving tanks into an inoperative position when a predetermined quantity of liquid has entered either of the measuring tanks, and means for thereafter shifting said deflector; substantially as described.

6. In a liquid meter, a receiving tank provided with an elongated discharge slot, a plurality of measuring tanks located underneath said receiving tank, an oscillating deflector for causing the liquid in the receiving tank to flow into either of said measuring tanks, a wrist plate connected to said deflector, discharge valves for said measuring tanks, links connecting said discharge valves to said wrist plate, locking devices coöperating with said wrist plate for holding said deflector in certain positions, and floats in said tanks for disengaging said locking devices from said wrist plates; substantially as described.

7. In a liquid meter, a receiving tank provided with an elongated discharge slot, a plurality of measuring tanks located underneath said receiving tank, an oscillating deflector for causing the liquid in the receiving tank to flow into either of said measuring tanks, a wrist plate connected to said deflector, discharge valves for said measuring tanks connected to said wrist plate, and links fastened to the stems of said valves and adjustably connected to said wrist plate; substantially as described.

8. In a fluid meter, a receiving tank provided with a discharge opening, a plurality of stationary measuring tanks, an oscillating deflector for causing the liquid in the receiving tank to flow into either of said measuring tanks, means operated by the weight of the liquid in the measuring tanks for shifting said deflector, locking means for holding said deflector in certain positions, and adjustable means operated by the rising of the liquid in said tank for tripping said locking means so as to enable the deflector to be moved; substantially as described.

9. In a fluid meter, a receiving tank provided with a discharge opening, a plurality of measuring tanks, an oscillating deflector for causing the liquid in the receiving tank to flow into either of said measuring tanks, means operated by the weight of the liquid in the measuring tanks for shifting said deflector, locking means for holding said deflector in adjusted position, floats arranged in said measuring tanks, and means actuated by said floats for releasing said deflector when the liquid in said measuring tanks reaches a certain level; substantially as described.

10. A fluid meter comprising a tank adapted to receive a stream of liquid, said tank being provided with a discharge opening, a plurality of stationary measuring tanks having discharge valves, an oscillating or pivotally mounted deflector for directing the liquid from the receiving tank into said measuring tanks, connections between said deflector and the discharge valves of the measuring tanks, locking means for holding said valves closed, said means being so constructed that the valve for one tank is closed while the valve for the other tank is open, and means operated by the liquid in said measuring tanks for tripping said locking means so that the valves for said tanks will open after a predetermined quantity of liquid has entered the tanks; substantially as described.

11. A liquid meter comprising a plurality of stationary measuring tanks provided with discharge valves, a member for deflecting or introducing liquid into said measuring tanks, connections between said member and said discharge valves, locking devices for holding said valves closed, said devices being so constructed that the valve for one tank is closed while the valve for the other tank is open, and means operated by the liquid in said measuring tanks for tripping said locking devices so that the valves for said tanks will open after a predetermined quantity of liquid has entered the tanks; substantially as described.

12. A liquid meter comprising a plurality of measuring tanks provided with discharge valves, a member for introducing or deflecting a liquid into said tanks, yielding connections between said discharge valves and said member, means for locking said member, and means for tripping said locking means to release said member; substantially as described.

In testimony whereof I hereunto affix my signature in the presence of two witnesses, this eighth day of February 1908.

CHESTER C. HAMMOND.

Witnesses:
 WELLS L. CHURCH,
 GEORGE BAKEWELL.